United States Patent [19]

Takahashi et al.

[11] Patent Number: 5,530,503
[45] Date of Patent: Jun. 25, 1996

[54] FILM FEEDING APPARATUS WITH DECELERATION CONTROL

[75] Inventors: Shinya Takahashi, Kodaira; Nobuyuki Tanaka, Hidaka, both of Japan

[73] Assignee: Olympus Optical Co., Ltd., Tokyo, Japan

[21] Appl. No.: 393,377

[22] Filed: Feb. 23, 1995

[30] Foreign Application Priority Data

Mar. 1, 1994 [JP] Japan .................................. 6-031362

[51] Int. Cl.$^6$ ................................................ G03B 1/18
[52] U.S. Cl. ............................... 354/173.1; 354/213
[58] Field of Search .................... 354/173.1, 173.11, 354/212, 213, 214, 217, 218

[56] References Cited

U.S. PATENT DOCUMENTS 4,878,077 10/1989 Maeno et al. ................ 354/173.1 X
5,057,859 10/1991 Ishimaru ...................... 354/173.1 X
5,210,562 5/1993 Miyazawa et al. ............ 354/173.1 X

FOREIGN PATENT DOCUMENTS 4-212943 8/1992 Japan .
4-367833 12/1992 Japan .

*Primary Examiner*—Howard B. Blankenship
*Attorney, Agent, or Firm*—Frishauf, Holtz, Goodman, Langer & Chick

[57] ABSTRACT

A motor drive circuit drives a motor to feed a film. A photoreflector detects a perforation formed in the film. A photointerrupter detects a drive amount of the film. A memory detects a 1-frame drive amount of the film on the basis of an output from the photoreflector and an output from a photointerrupter to store the 1-frame drive amount. A CPU reduces a feeding speed of the film on the basis of the 1-frame drive amount stored in the memory and the drive amount detected by the photointerrupter before the 1-frame winding operation is ended. The film having a minimum number of perforations can be accurately stopped at a photographic frame position, and a film end can be detected at high accuracy.

22 Claims, 8 Drawing Sheets

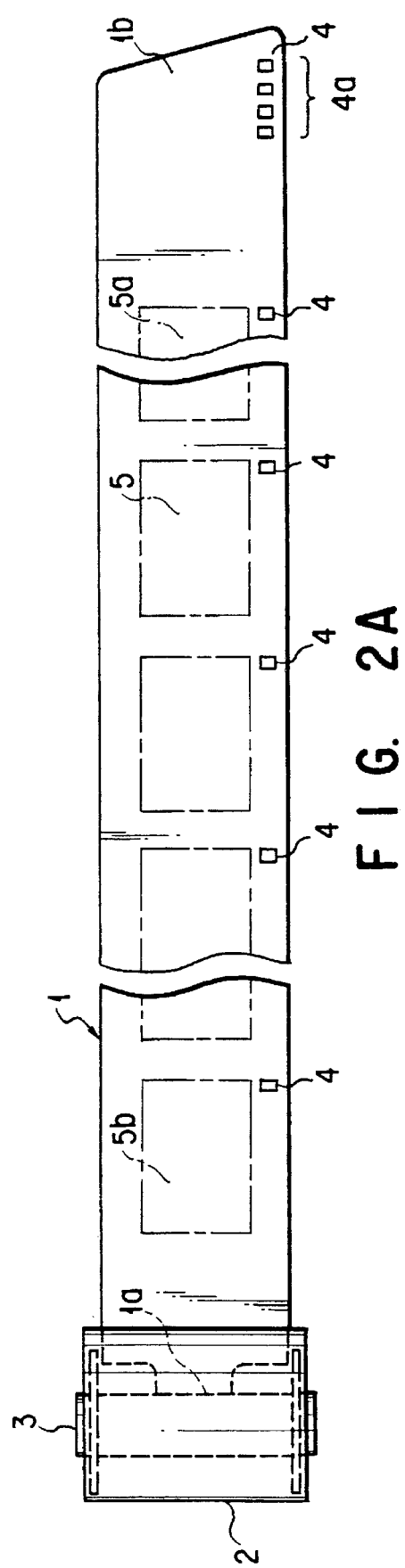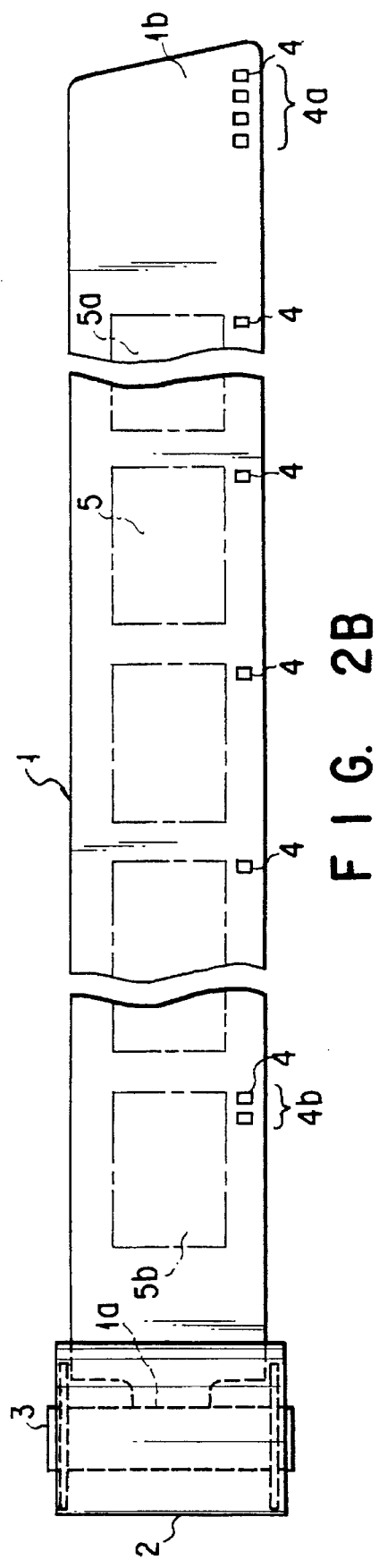

FILM FEEDING APPARATUS WITH DECELERATION CONTROL

BACKGROUND OF THE INVENTION

1. Field of the Invention

The present invention generally relates to a camera and, more particularly, to a film feeding apparatus for feeding a photographic film stored in a film cartridge main body for a camera.

2. Description of the Related Art

Conventionally, for example, Jpn. Pat. Appln. KOKAI Publication No. 4-367833 discloses a technique related to a film having leader portion detecting perforations, frame position detecting perforations, and end detecting perforations, and a film feeding apparatus for a camera in which the end of the film can be detected, the frame position can be detected, and the film can be rewound except for the leader portion.

In addition, Jpn. Pat. Appln. KOKAI Publication No. 4-212943 discloses a technique in which, in a camera using a film having a minimum number of perforations, a film feeding speed is reduced at a predetermined timing before the perforations are detected by a perforation detecting means and a timer means.

However, in the technique disclosed in Jpn. Pat. Appln. KOKAI Publication No. 4-367833, film end detecting perforations are required, and braking control cannot be performed. For this reason, the film cannot be fed/stopped at an accurate photographic frame position.

In the technique disclosed in Jpn. Pat. Appln. KOKAI Publication No. 4-212943, when the film feeding speed changes, a braking timing varies. For this reason, the film cannot be fed/stopped at an accurate photographic frame position.

SUMMARY OF THE INVENTION

It is, therefore, an object of the present invention to provide a new and improved film feeding apparatus for a camera in which a film having a minimum number of perforations can be accurately stopped at each photographic frame position, and a film end can be detected at high accuracy.

According to an aspect of the present invention, there is provided a film feeding apparatus for a camera, comprising: film feeding means for feeding a film; perforation detecting means for detecting a perforation formed in the film; drive amount detecting means for detecting a drive amount provided by the film feeding means; storing means for detecting the drive amount corresponding to one frame of the film on the basis of an output from the perforation detecting means and an output from the drive amount detecting means to store a 1-frame drive amount; and deceleration control means for reducing a feeding speed of the film feeding means on the basis of the 1-frame drive amount stored in the storing means and a drive amount detected by the drive amount detecting means in a next winding operation before a 1-frame winding operation is ended by the film feeding means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 2A and 2B are views showing the arrangements of films employed in the present invention;

DETAILED DESCRIPTION OF THE PREFERRED EMBODIMENT

Figure 1:
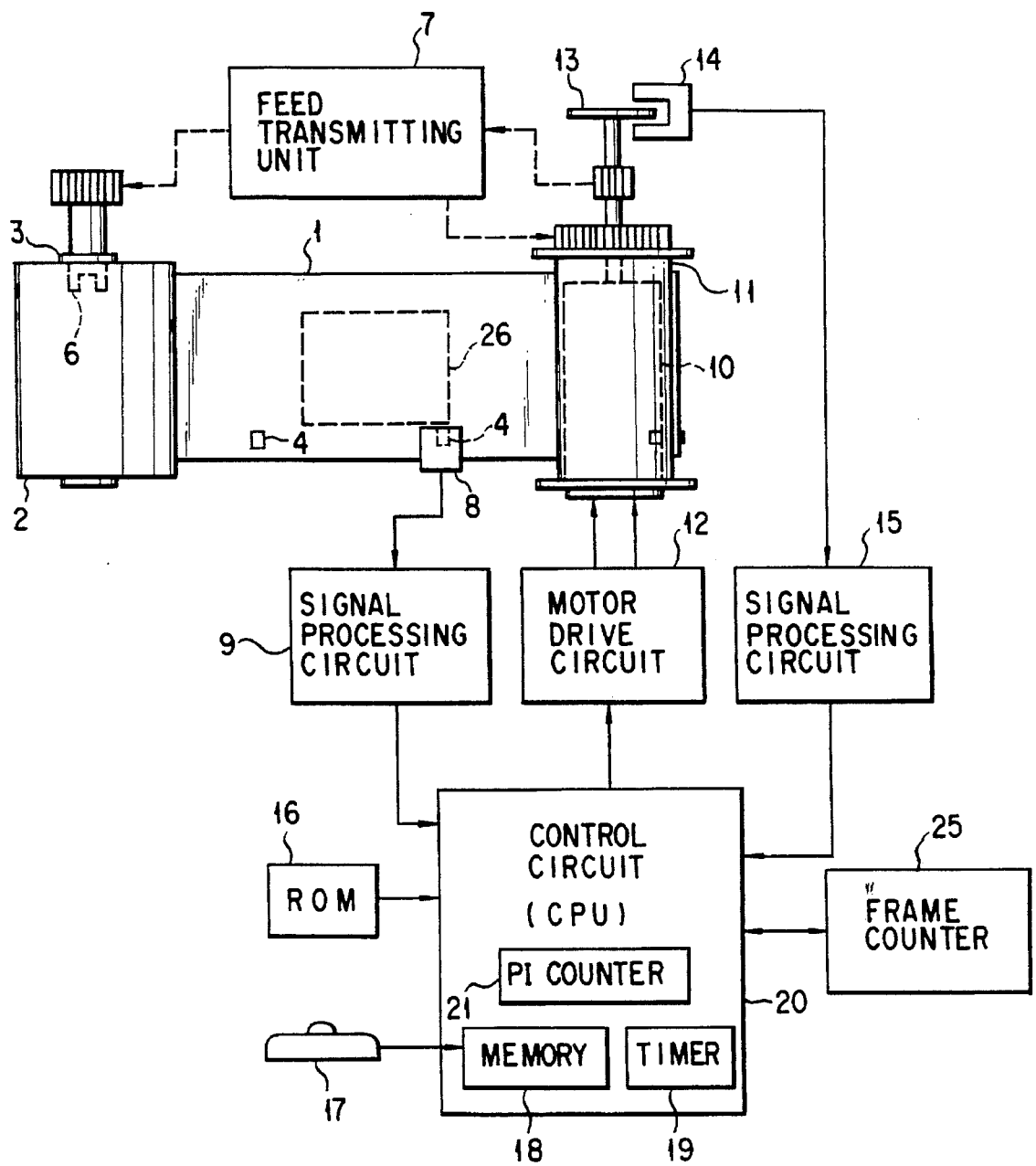
FIG. 1 is a circuit diagram showing the arrangement of a film feeding apparatus according to the first embodiment of the present invention.

Reference will now be made in detail to the presently preferred embodiments of the invention as illustrated in the accompanying drawings, in which like reference characters designate like or corresponding parts throughout the several drawings.

Embodiments of the present invention will be described below with reference to the accompanying drawings.

FIGS. 2A and 2B show the arrangements of films employed in the present invention.

A film spool 3 is pivotally arranged inside a cartridge main body 2, and an end portion 1a of a film 1 shown in FIG. 2A is fixed to the film spool 3. FIG. 2A especially shows a state wherein the film 1 is entirely drawn from the cartridge main body 2. However, in a non-exposed state, the film 1 is wound on the film spool 3 like a roll, and the film 1 is stored in the cartridge main body 2. Four perforations 4 are continuously formed at a predetermined interval in one edge portion of a leader portion 1b to constitute a leader portion detecting/camera spool winding perforation group 4a. perforation 4 are formed along a straight line extending from the leader portion detecting perforation group 4a to respectively correspond to photographic frames 5.

In the film shown in FIG. 2B, two perforations 4 are continuously formed for a last frame 5b to constitute a film end portion detecting perforation group 4b.

FIG. 1 shows the arrangement of a film feeding apparatus for a camera according to the first embodiment of the present invention. As shown in FIG. 1, a fork 6 which is driven in a film feeding operation and a film winding operation is engaged with the film spool 3, and the fork 6 is driven through a feed transmitting unit 7 by a motor 10 arranged inside a winding spool 11 arranged in a camera body. The motor 10 is controlled to be driven by a control circuit (central processing unit: CPU) 20 through a motor drive circuit 12. An encoder 13 is fixed on a shaft extending from the output shaft of the motor 10, and the encoder 13 is rotated together with the output shaft of the motor 10. Note that the encoder 13 may be arranged in the feed transmitting unit 7 without being fixed to the output shaft of the motor 10, as a matter of course.

Radial slits are formed at a predetermined pitch in the encoder 13, and the rotation of the encoder 13 is detected by a photointerrupter (PI) 14. This PI 14 is connected to the CPU 20 through a signal processing unit 15 and controlled by the CPU 20. A photoreflector (PR) 8 is arranged on a film feeding path near an aperture 26. The perforations 4 are detected by the PR 8, and information from the PR 8 is input to the CPU 20 through the signal processing unit 15. A frame counter 25 for counting the number of film frames, a read-only memory (ROM) 16 in which various program sequences and the like are stored, and a release button 17 for transmitting a release signal are connected to the CPU 20. In addition, the CPU 20 has a PI counter 21, a random access memory (RAM) 18, and a timer 19 which are arranged inside the CPU 20.

Figure 3:
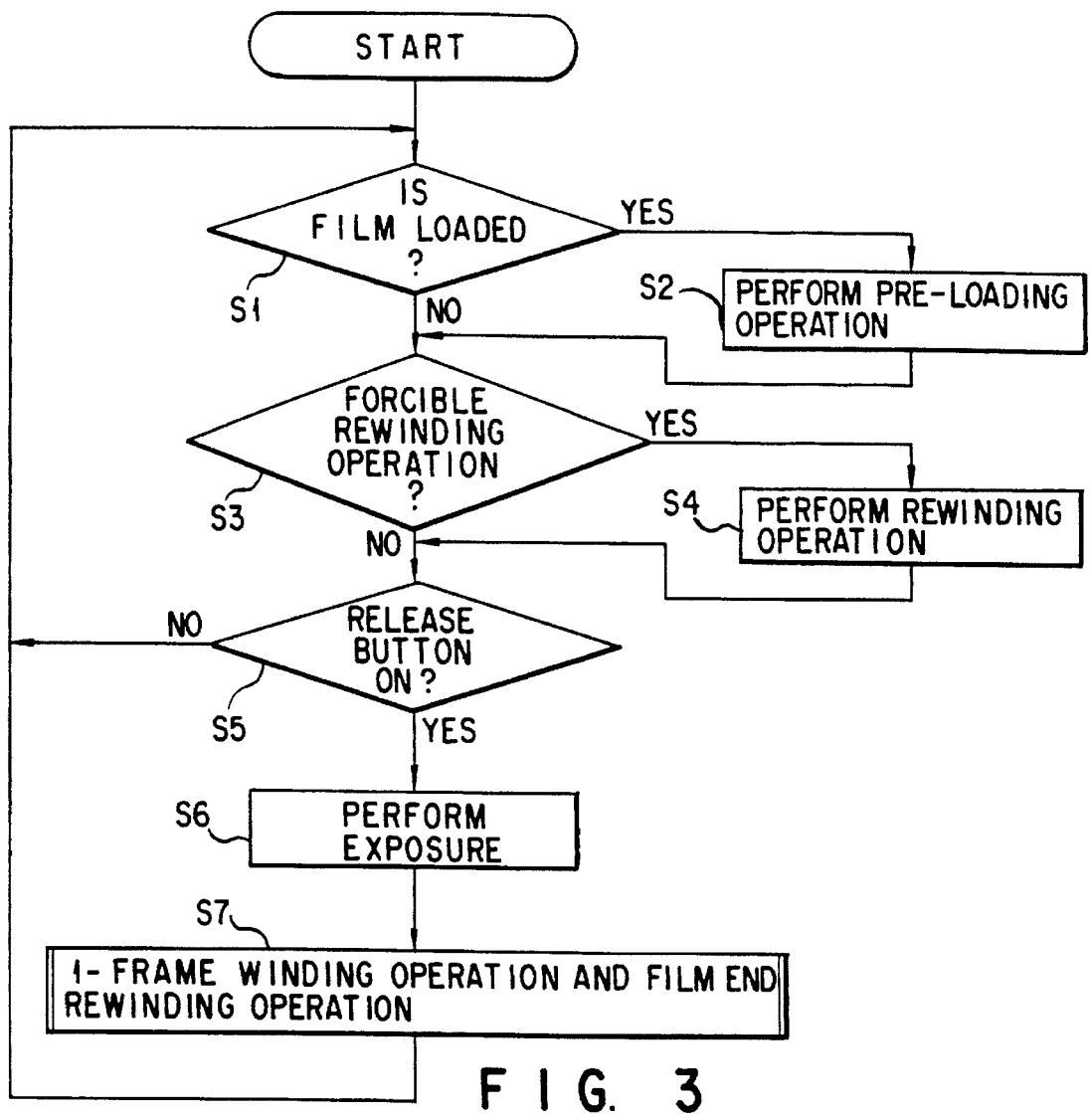
FIG. 3 is a flow chart showing the schematic sequence of an entire photographic operation of a camera which employs the film feeding apparatus according to the first embodiment.

A schematic sequence of the entire photographic operation of a camera which employs the film feeding apparatus according to the first embodiment will be described below with reference to a flow chart in FIG. 3.

When a photographer loads the cartridge main body 2, in which the film 1 described above is wound, in a cartridge chamber (not shown) arranged in a camera main body (not shown), the CPU 20 drives the motor 10 forward by a predetermined amount through the motor drive circuit 12 to start a pre-loading operation for etting a first frame 5a of the film 1 to the aperture 26, i.e., to start an initial film feeding operation (steps S1 and S2). If the photographer wants to rewind the film 1 before taking pictures up to the last frame, a rewind switch (not shown) is operated to cause the CPU 20 to drive the motor 10 backward through the motor drive circuit 12, thereby executing a forcible rewinding operation (steps S3 and S4). If the photographer wants to continue the photographic operation, the CPU 20 waits until the release button 17 is depressed. When the release button 17 is depressed to cause the CPU 20 to receive a release ON signal, the CPU 20 commands the start of exposure (steps S5 and S6).

Upon completion of exposure, the CPU 20 drives the motor 10 forward through the motor drive circuit 12 to wind the film 1 by one frame, and the CPU 20 waits until the release button 17 is depressed again. Note that, when all the effective photographic frames of the film 1 are photographed, the CPU 20 drives motor 10 backward through the motor drive circuit 12 on the basis of detection of the end detecting perforation group 4b by the PR 8, thereby rewinding the film 1 (step S7).

The 1-frame winding sequence of the film 1 in step S7 will be described below with reference to the flow chart in FIG. 4. In this case, the film 1 has the 10 arrangement shown in FIG. 2A.

The CPU 20 initializes a rotation pulse count PIx of the PI counter 21 for detecting the rotation amount of the motor 10 to "0" (step S101). The CPU 20 checks whether a photographic frame count Fcount has a value "1" corresponding to the first frame (step S102). If Fcount=1 representing the state wherein a pre-loading operation has just been ended, a rotation pulse count PIlast is set to be, e.g., ten as an initial setting because no data pulse count PIlast data is obtained in the preceding 1-frame feeding operation (step S103).

When the CPU 20 drives the motor 10 forward through the motor drive circuit 12, the fork 6 engaged with the film spool 3 is moved together with the motor 10 through the feed transmitting unit 7, thereby feeding the film 1 (step S104). The CPU 20 checks through the signal processing unit 15 whether a signal from the PI 14 based on the rotation of the motor 10 is input to the CPU 20 (step S105). If YES in step S105, the rotation pulse count PIx of the PI counter 21 is incremented (step S106).

The CPU 20 checks whether the rotation pulse count PIx of the motor 10 is equal to a value obtained by multiplying the preceding 1-frame rotation pulse count PIlast by 0.8 (step S107). If YES in step S107, the CPU 20 performs a short braking operation for the motor 10 through the motor drive circuit 12 to reduce a film feeding speed (step S108). In this case, the value obtained by multiplying the rotation pulse count PIlast by 0.8 is used as a comparison value because a braking operation is started immediately before a 1-frame winding operation is ended. An arbitrary constant which is less than 1 or empirical data obtained by an experiment is more preferably used as the comparison value.

In order to detect the film end, the CPU 20 checks whether the rotation pulse count PIx of the PI 14 reaches a value obtained by multiplying the rotation pulse count PIlast by 1.5 (step S109). If NO in step S109, the CPU 20 checks whether the perforation of the next photographic frame is detected (step S110). Although the multiplier is set to be 1.5, a proper value which is more than 1 may be set on the basis of an experiment or the like such that the film end can be detected.

In this case, when the CPU 20 cannot detect the perforation of the next frame, the winding operation for the film 1 is continued, and the rotation pulse count PIx is incremented in steps S105 and S106. When the perforation of the next frame is detected, the rotation pulse count PIx obtained in detection of the perforation is stored as the rotation pulse count PIlast in the memory 18 arranged inside the CPU 20 (step S110).

The CPU 20 brakes the motor 10 through the motor drive circuit 12 to stop the film feeding operation. In this case, a time required for braking is long enough to stop the motor 10 (step S111). After the CPU 20 waits for a predetermined time (step S112), the CPU 20 turns off the motor 10 through the motor drive circuit 12 (step S113). In this manner, the photographic frame count Fcount obtained by the frame counter 25 is incremented (step S114), and the 1-frame winding sequence is ended (step S115).

Assume that the CPU 20 cannot detect the perforation of the next frame even if the rotation pulse count PIx becomes 1.5 times the rotation pulse count PIlast in step S109. In this case, the CPU 20 determines that the film end is detected, and the CPU 20 brakes the motor 10 to stop the film feeding operation (step S117). After the CPU 20 waits for a predetermined short time (step S118), the CPU 20 turns off the motor 10 (step S119). After the CPU 20 performs a rewinding operation (to be described later) for the film 1 (step S120), this sequence is ended (step S115).

In this embodiment, a short braking operation is performed each time YES is determined in step S107. However, if the speed of the motor can be satisfactorily reduced by performing the short braking operation once, the short braking operation need not be performed each time YES is determined in step S107, as a matter of course.

Figure 4:
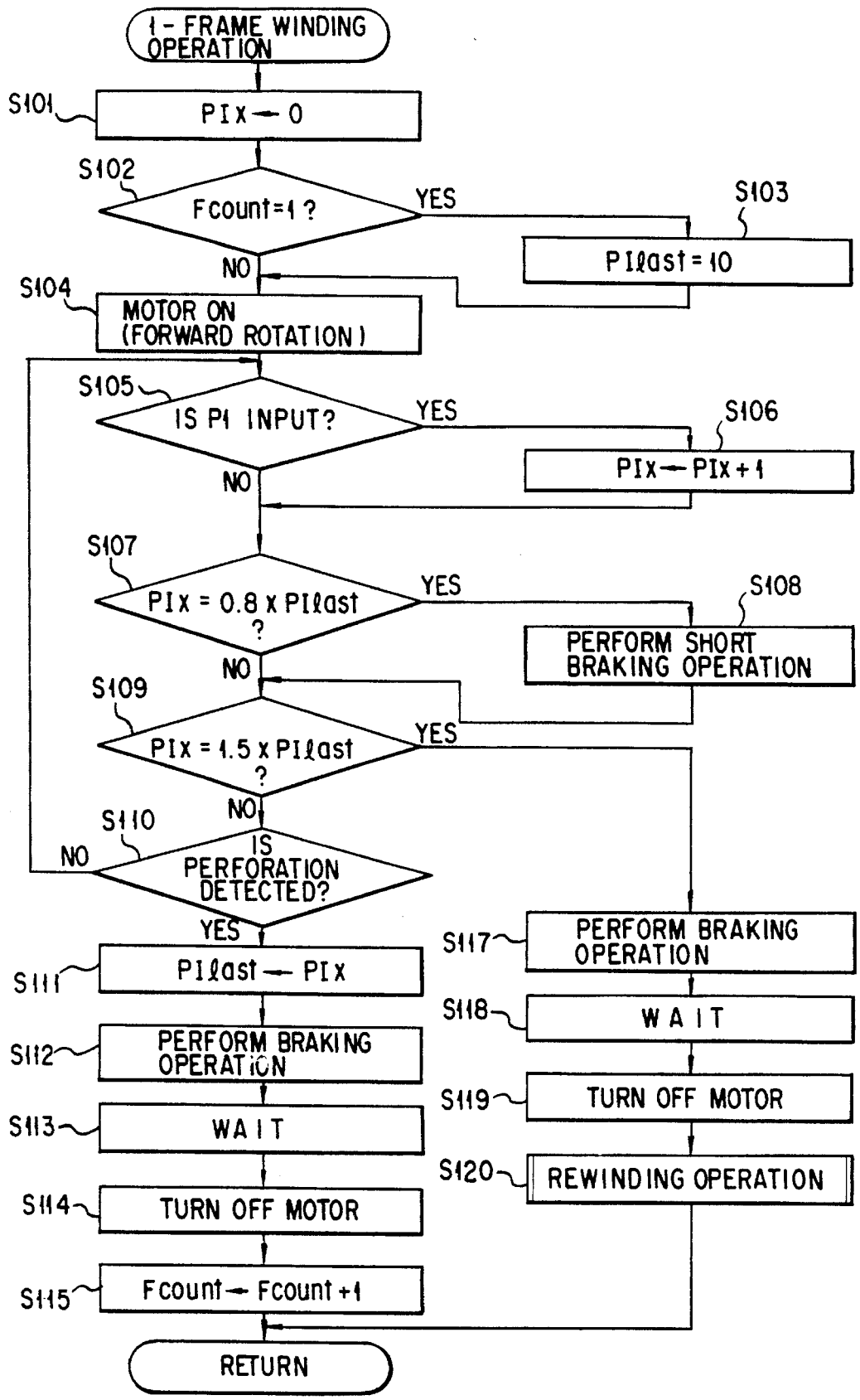
FIG. 4 is a flow chart showing a 1-frame winding sequence for a film 1 in step S7.
Figure 5:
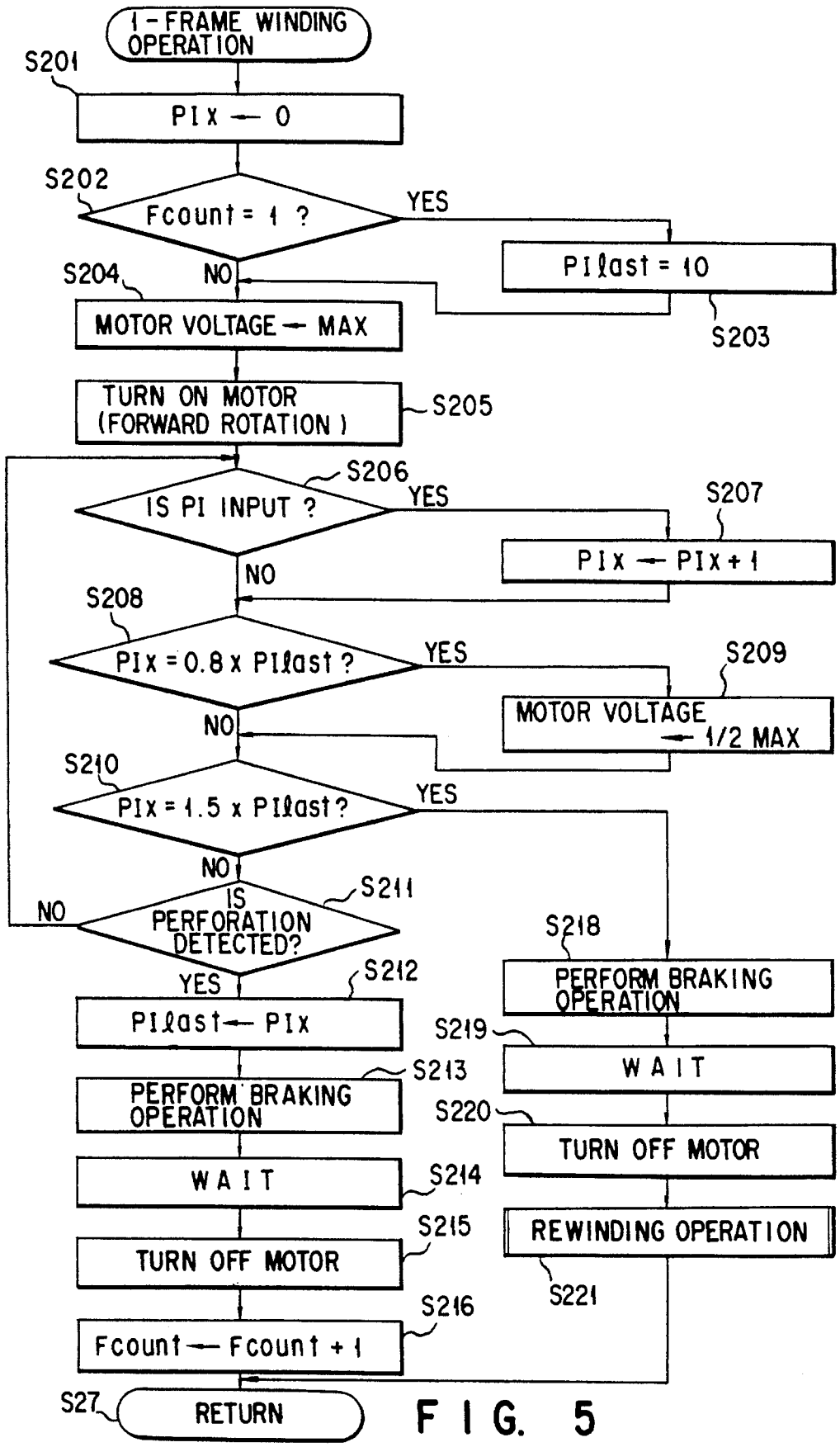
FIG. 5 is a flow chart showing a sequence obtained by improving the sequence shown in FIG. 4.

The 1-frame winding sequence for the film 1 in step S7 shown in FIG. 4 can be improved as shown in a flow chart of FIG. 5.

More specifically, the CPU 20 initializes the rotation pulse count PIx of the PI counter 21 to "0" to detect the rotation amount of the motor 10 (step S201). The CPU 20 checks whether the photographic frame count Fcount has a value "1" corresponding to the first frame (step S202). If Fcount=1 representing the state wherein a pre-loading operation has just been ended, the rotation pulse count PIlast is set to be, e.g., ten as an initial setting because no pulse count PIlast data is obtained in the preceding 1-frame feeding operation (step S203).

The CPU 20 sets a motor voltage to be MAX (step S204). When the CPU 20 drives the motor 10 forward, the fork 6 engaged with the film spool 3 is moved together with the motor 10, and the film 1 is fed (step S204). The CPU 20 checks whether a signal from the PI 14 based on the rotation of the motor 10 is input to the CPU 20 (step S206). If YES in step S206, the rotation pulse count PIx of the PI 14 is incremented (step S207).

The CPU 20 checks whether the rotation pulse count PIx of the motor 10 is equal to a value obtained by multiplying the preceding 1-frame rotation pulse count PIlast by 0.8 (step S208). If YES in step S208, the motor voltage is set to be ½ MAX to reduce a film feeding speed (step S209). In this case, the value obtained by multiplying the rotation pulse count PIlast by 0.8 is used as a comparison value because a braking operation is started immediately before a 1-frame winding operation is ended. An arbitrary constant which is less than 1 or empirical data obtained by an experiment is more preferably used as the comparison value.

In order to detect the film end, the CPU 20 checks whether the rotation pulse count PIx reaches a value obtained by multiplying the rotation pulse count PIlast by 1.5 (step S210). If NO in step S210, the CPU 20 checks whether the perforation of the next photographic frame is detected (step S211).

In this case, when the CPU 20 cannot detect the perforation of the next frame, the winding operation for the film 1 is continued, and the rotation pulse count PIx is incremented in steps S206 and S207. When the perforation of the next frame is detected, the CPU 20 stores the rotation pulse count PIx obtained in detection of the perforation as the rotation pulse count PIlast in the memory 18 arranged inside the CPU 20 (step S212).

The CPU 20 brakes the motor 10 to stop the film feeding operation (step S213). After the CPU 20 waits for a predetermined time (step S214), the CPU 20 turns off the motor 10 (step S215). In this manner, the CPU 20 increments the photographic frame count Fcount (step S216), and the 1-frame winding sequence is ended (step S217).

Assume that the CPU 20 cannot detect the perforation of the next frame even if the rotation pulse count PIx becomes 1.5 times the rotation pulse count PIlast in step S210. In this case, the CPU 20 determines that the film end is detected, and the CPU 20 brakes the motor 10 to stop the film feeding operation (step S218). After the CPU 20 waits for a predetermined short time (step S219), the CPU 20 turns off the motor 10 (step S220). After the CPU 20 performs a rewinding operation (to be described later) for the film 1 (step S221), this sequence is ended (step S217).

Figure 6:
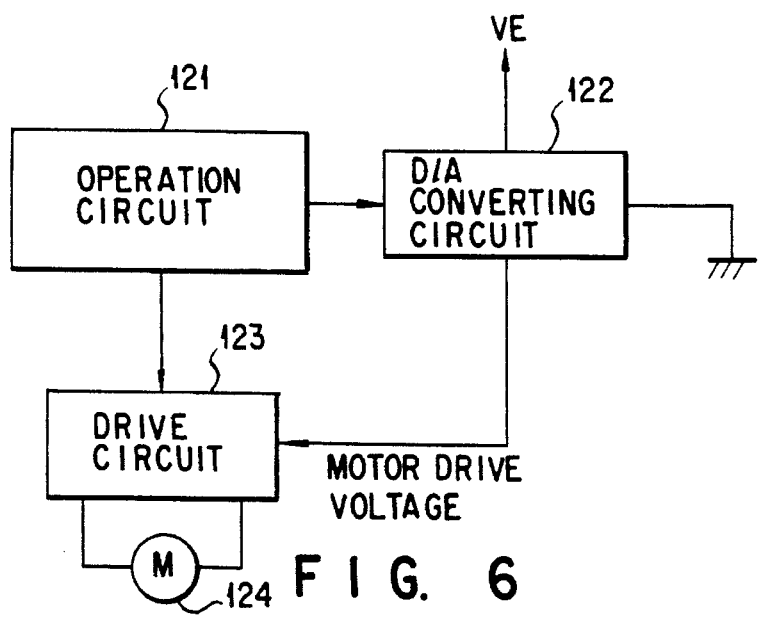
FIG. 6 is a circuit diagram showing a main part for realizing the 1-frame feeding control shown in FIG. 5.

FIG. 6 is a schematic circuit diagram showing a main part for realizing the 1-frame feeding control shown in FIG. 5. As shown in FIG. 6, drive ratio data calculated by an operation circuit 121 is D/A-converted by a digital/analog (D/A) converting circuit 122. The analog data is converted into a motor drive voltage and applied to a motor 124 through a drive circuit 123, thereby controlling the rotating speed of the motor 124.

In this case, a drive ratio of 100% is preferably set at a power supply output voltage, and a drive ratio of 0% is preferably set at a voltage lower than a battery output voltage. A film feeding apparatus in which a stepping motor, an ultrasonic motor, and the like are used in place of the DC motors 124 and 10 such that rotational speeds can be controlled by drive circuits respectively arranged for the motors can be employed as a film feeding apparatus according to the present invention.

A film rewinding sequence performed after the film end is detected in step S7 will be described below with reference to a flow chart in FIG. 7.

The CPU 20 turns on the motor 10 through the motor drive circuit 12 to drive the motor 10, and the CPU 20 rotates the motor 10 backward to rewind the film 1 (step S301). When the CPU 20 detects the perforations of the last frame of the film 1 in response to an output from the PR 8 (step S302), the CPU 20 initializes a pulse value PIint of the interval of the perforations to "0" (step S303), and the CPU 20 initializes the rotation pulse count PIx of the motor 10 to "0" (step S304).

The CPU 20 checks whether a signal from the PI 14 is input to the CPU 20 (step S305). If YES in step S305, the CPU 20 adds "1" to the rotation pulse count PIx (step S315), and the CPU 20 checks whether the next perforation is detected (step S306). If NO in step S306, the rewinding operation for the film 1 is continued, and the rotation pulse count PIx is incremented.

If the CPU 20 can detect the perforation, the flow advances to step S307 to check whether the pulse value PIint is "0" (step S307). If NO in step S307, the CPU 20 checks whether the rotation pulse count PIx is larger than a value obtained by multiplying the pulse value PIint by ¼ (step S308).

In this case, if YES in step S308, or if YES in step S307, the CPU 20 stores the rotation pulse count PIx obtained in detection of the perforation as the pulse value PIint in the memory 18 arranged in the CPU 20, and the flow returns to step S304 (step S309).

The rewinding operation is continued, and the rotation pulse count PIx is equal to or smaller than ¼ the pulse value PIint in step S308. At this time, the CPU 20 determines that the leader portion 1b of the film 1 is detected, and the flow advances to the sequence from step S310. The CPU 20 performs a braking operation for the motor 10 (step S310) to check whether the last perforation is detected (step S311).

In order to check whether the last perforation is detected, the CPU 20 counts perforations of the film 1 after "NO" is determined in step S308. When the count value becomes equal to the number of perforations 4a of the leader portion (four perforations in this embodiment), the CPU 20 determines that the last perforation is detected. When the CPU 20 detects the last perforation, the CPU 20 waits for a short time until a film is completely stored (step S312). The CPU 20 turns off the motor 10 (step S313), and the CPU 20 ends the rewinding operation performed after the film end is detected (step S314).

Figure 7:
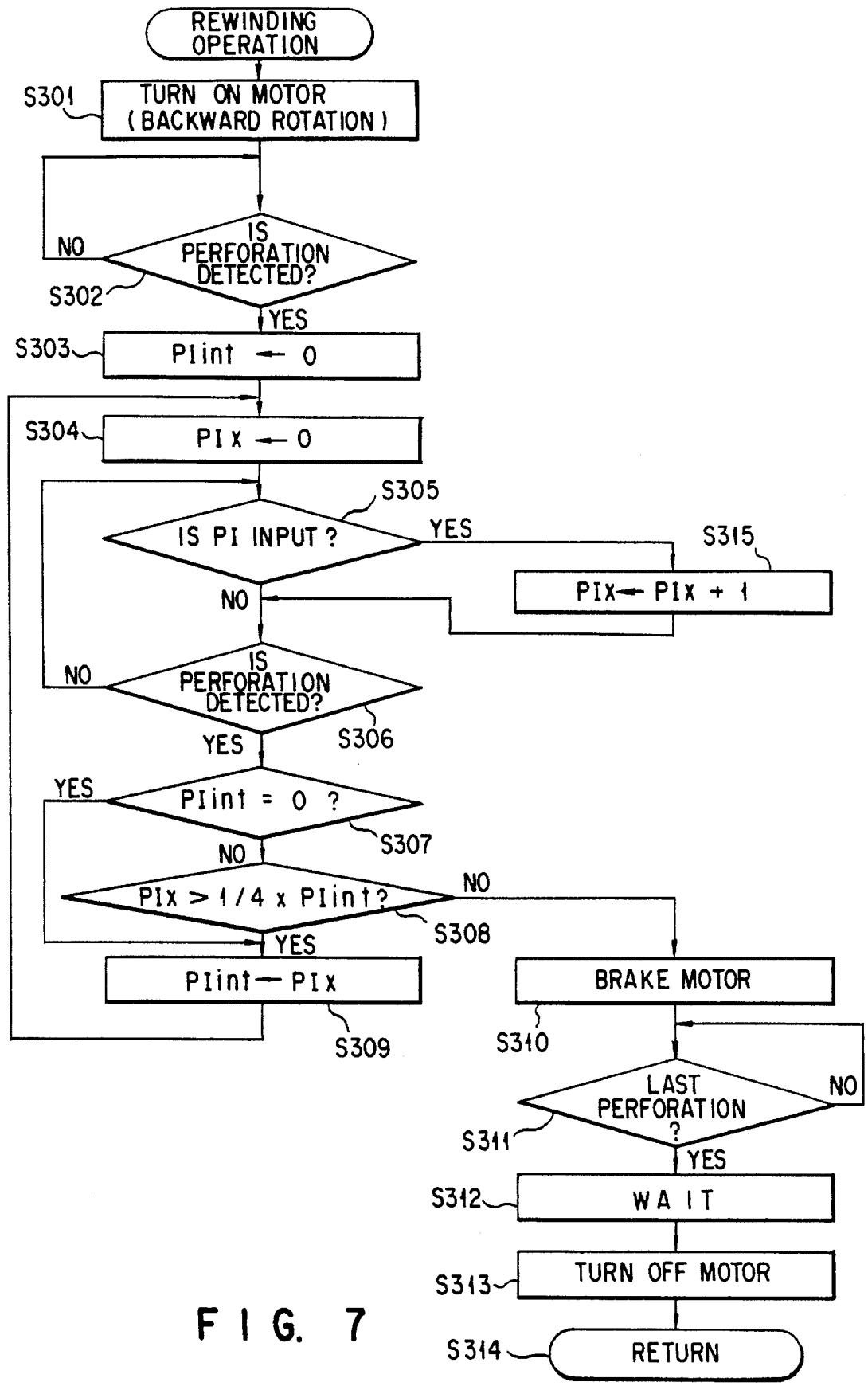
FIG. 7 is a flow chart showing a film rewinding sequence in step S7 after a film end is detected.
Figure 8:
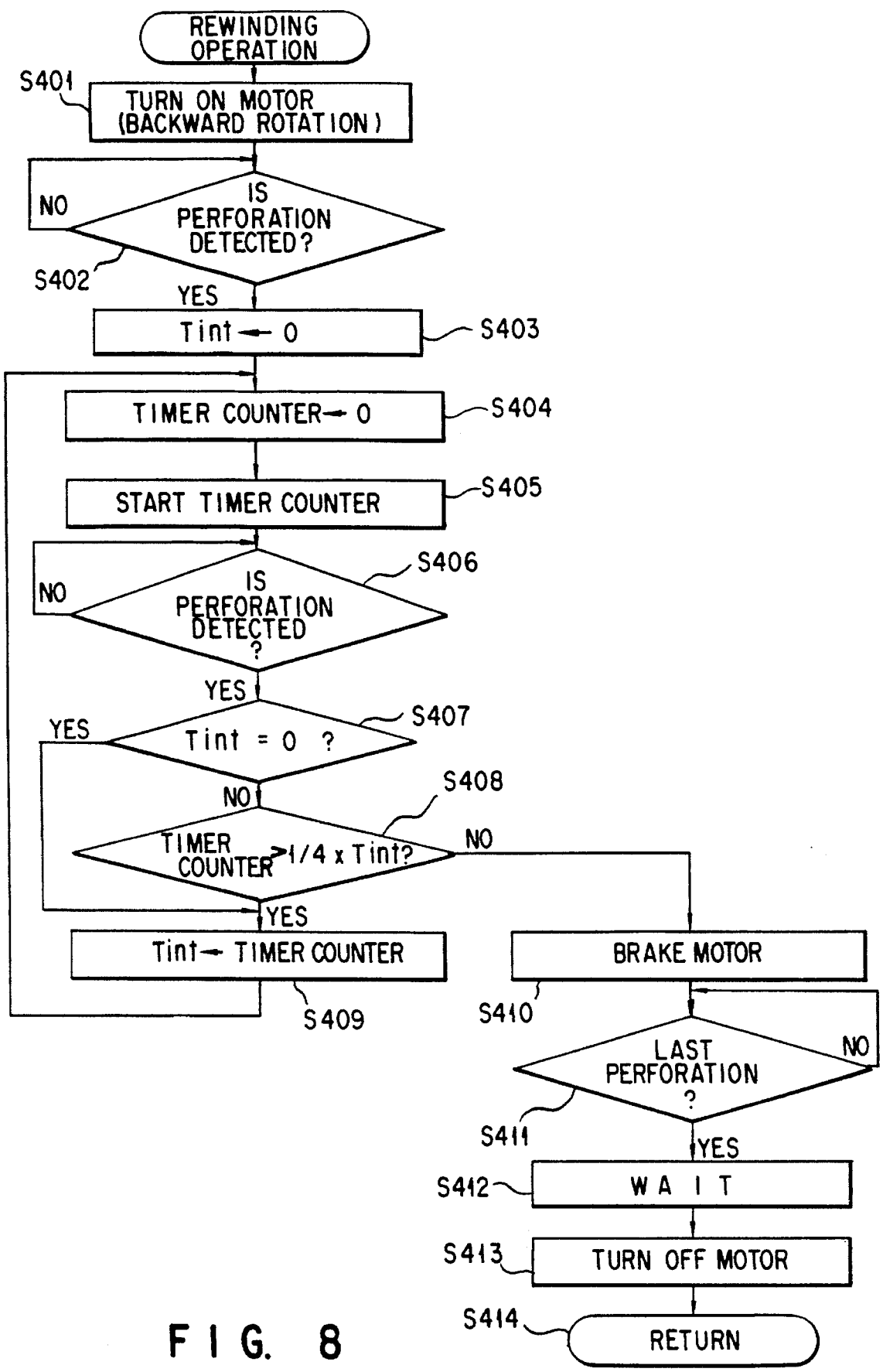
FIG. 8 is a flow chart showing a sequence obtained by improving the sequence shown in FIG. 7.
Figure 9:
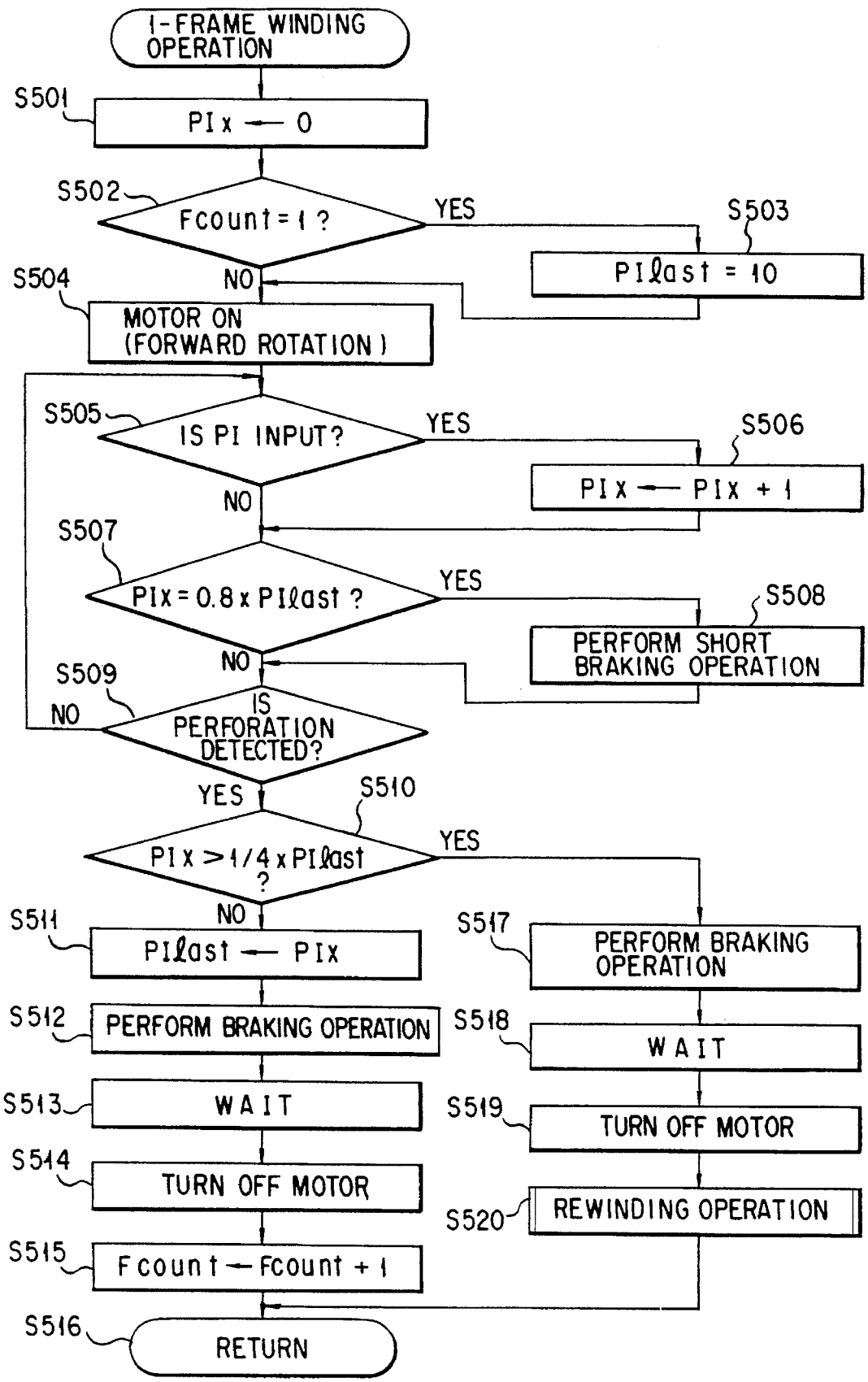
FIG. 9 is a flow chart showing a 1-frame winding sequence, in a case wherein the film shown in FIG. 2B is used, as the second embodiment of the present invention.

In this case, the film rewinding sequence, performed after the film end is detected in step S7 of FIG. 7 can be improved as shown in a flow chart of FIG. 8.

The CPU 20 turns on the motor 10 to drive the motor 10, and the CPU 20 rotates the motor 10 backward to rewind the film 1 (step S401). When the CPU 20 detects the perforations of the last frame (step S402), the CPU 20 initializes a 1-frame film feed time Tint to "0" (step S403), and the CPU 20 initializes the timer counter to "0" (step S404).

The CPU 20 starts time measurement of the timer counter (step S405), and the CPU 20 checks whether the next perforation can be detected (step S406). If NO in step S406, the rewinding operation is continued, and the value of the timer counted is incremented.

If the CPU 20 can detect the perforation, the flow advances to step S407 to check whether the film feed time Tint is "0" (step S407). If NO in step S407, the CPU 20 checks whether the value of the timer counter is larger than a value obtained by multiplying the film feed time Tint by ¼ (step S408).

In this case, if YES in step S408, or if YES in step S407, the CPU 20 stores the value of the pulse count timer counter obtained in detection of the perforation as the film feed time Tint in the memory 18 arranged in the CPU 20, and the flow returns to step S404 (step S409).

The film rewinding operation is continued, and the value of the timer counter is equal to or smaller than ¼ the film feed time Tint in step S408. At this time, the CPU 20 determines that the leader portion 1b of the film 1 is detected, and the flow advances to the sequence from step S410. The CPU 20 performs a braking operation for the motor 10 (step S410) to check whether the last perforation is detected (step S411). If YES in step S411, the CPU 20 waits for a short time until a film is completely stored (step S412). The CPU 20 turns off the motor 10 (step S413), and the rewinding operation performed after the film end is detected is ended (step S414).

A film feeding apparatus according to the second embodiment of the present invention will be described below.

This embodiment has the same arrangement as that of the first embodiment shown in FIG. 1 except for a sequence related to a film winding operation. A description of the arrangement will be omitted.

A 1-frame winding sequence in a case wherein the film shown in FIG. 2B is used in the second embodiment will be described below. The CPU 20 initializes a rotation pulse count PIx of a PI counter for detecting the rotation amount of a motor 10 to "0" (step S501). The CPU 20 checks whether a photographic frame count Fcount has a value "1" corresponding to the first frame (step S502). If Fcount=1 representing the state wherein a pre-loading operation has just been ended, a rotation pulse count PIlast is set to be ten as an initial setting because no pulse count PIlast data is obtained in the preceding 1-frame feeding operation (step S503).

When the CPU 20 drives the motor 10 forward, a fork 6 engaged with a film spool 3 is moved together with the motor 10, thereby feeding the film 1 (step S504). The CPU 20 checks whether a signal from the PI 14 based on the rotation of the motor 10 is input to the CPU 20 (step S505). If YES in step S505, a PI pulse count PIx is incremented (step S506).

The CPU 20 checks whether the rotation pulse count PIx of the motor 10 is equal to a value obtained by multiplying the preceding 1-frame rotation pulse count PIlast by 0.8 (step S507). If YES in step S507, the CPU 20 performs a short braking operation for the motor 10 to reduce a film feeding speed (step S508). In this case, the value obtained by multiplying the rotation pulse count PIlast by 0.8 is used as a comparison value because a braking operation is started immediately before a 1-frame winding operation is ended. An arbitrary constant which is less than 1 or empirical data obtained by an experiment is more preferably used as the comparison value.

If the perforation of the next frame cannot be detected, the winding operation for the film 1 is continued, and the rotation pulse count PIx is incremented in steps S505 and S506 (step S509). If the perforation of the next frame is detected, the CPU 20 operates as a film end determining means to check whether the rotation pulse count PIx is larger than a value obtained by multiplying the rotation pulse count PIlast by ¼ (step S510). If NO in step S510, the flow returns to step S509. If YES in step S510, the rotation pulse count PIx obtained in detection of the perforation is stored in a memory 18 as the rotation pulse count PIlast (step S511).

The CPU 20 brakes the motor 10 to stop the film feeding operation (step S512). After the CPU 20 waits for a predetermined time (step S513), the CPU 20 turns off the motor 10 (step S514). In this manner, the CPU 20 increments the frame count Fcount (step S515), and the 1-frame winding sequence is ended (step S516).

When the rotation pulse count PIx becomes ¼ times the rotation pulse count PIlast in step S510, the CPU 20 determines that the film end is detected. The CPU 20 brakes the motor 10 to stop the film feeding operation (step S517). After the CPU 20 waits for a predetermined short time (step S518), the CPU 20 turns off the motor 10 (step S519). After the CPU 20 performs a rewinding operation (to be described later) for the film 1 (step S520), this sequence is ended (step S516). Note that details of a rewinding operation in step S520 in this sequence are as shown in FIGS. 7 and 8.

The first and second embodiments of the present invention have been described above. The present invention is not limited to the first and second embodiments, and various modifications and changes can be effected, as a matter of course. For example, the values of the constants and coefficients used in FIGS. 4, 5, 7, 8, and 9 are only examples, and the values can be changed into arbitrary values in accordance with data obtained in an experiment or the like, as a matter of course.

As has been described above, when a film is wound round the winding spool on the camera side, the diameter of the wound film increases, and the ratio of a film feed amount to the drive amount of the winding spool on the camera side changes. In this case, however, the film feeding apparatus according to the present invention is not adversely affected.

In addition, since a braking operation can be performed using a drive amount of a preceding 1-frame feeding operation, a high-speed frame feeding operation can be accurately performed.

As a modification, a method in which the number of pulses generated up to the next frame is predicted using pulse data from a pulse generating means in the first 1-frame feeding operation can be considered. More specifically, the number of pulses in each of the second and sequential 1-frame feeding operations can be predicted on the basis of the film thickness and pulse data from the pulse generating means in the first 1-frame feeding operation.

For example, assume that the film thickness is set to be 0.12 mm, the length of a film wound on the camera spool is set to be 860 mm, and that the diameter of the winding spool of the camera is set to be 10 mm. In this case, when the entire film is wound on the camera spool, the diameter becomes 15.2 mm. When a 36-frame film is used, the diameter becomes 1.012 times each time a 1-frame feeding operation is performed. For this reason, it can be predicted that the number of motor pulses required for a 1-frame winding operation can be decreased to be 0.988 times (1/1.014). Therefore, assuming that the pulse count in the first 1-frame feeding operation is 12, it is predicted that the pulse count in the next 1-frame feeding operation is 11.85, and that the pulse count in the last 1-frame feeding operation is about 6.84.

This method can solve the problem in which when the number of film perforations is small, and the motor is braked in a high-speed feeding operation after the perforations are detected, the stop position of the film varies. In addition, a motor control pulse generating means can be easily controlled if it is arranged near the motor. If the motor control pulse generating means is very far from the motor, the motor control pulse generating means is influenced by backlash of a gear and distortion of the shaft and teeth of the gear, and the pulse count for each frame changes.

As control (deceleration) of the feeding speed of the film feeding means, curve control, i.e., fuzzy control, in which a moving speed is accurately reduced in a target position along a stored deceleration curve as shown in U.S. Pat. No. 4,878,077 assigned by the assignee of the present application may be used, as a matter of course. Therefore, the description of U.S. Pat. No. 4,878,077 is incorporated herein.

According to the present invention, before a 1-frame winding operation is ended, the speed of the film feeding speed is reduced. For this reason, the film can be accurately stopped at a predetermined position. According to the present invention, since the winding speed of the film can be controlled on the basis of a drive amount detected in the preceding 1-frame feeding operation, a decelerating operation can be more properly performed. According to the present invention, the proper decelerating operation can be performed for the first frame at a predetermined position without using preceding drive amount data. According to the present invention, the film feeding operation can be reliably stopped upon completion of the 1-frame winding operation on the basis of information obtained by film perforations. According to the present invention, the speed of the film feeding operation can be reduced with a simple arrangement. Note that duty drive and a reduction in a voltage applied to a motor may be simultaneously performed. According to the present invention, since decelerating timings are determined on the basis of pulses generated by the pulse generating means, the decelerating timing does not vary, and the film feeding operation can be accurately stopped each time the 1-frame winding operation is performed. According to the present invention, a rewinding operation can be determined using pulses generated by the pulse generating means to obtain a simple arrangement. According to the present invention, the first 1-frame winding operation can be accurately stopped. According to the present invention, when a film having end detecting perforations is used, the end of the film can be reliably detected, and a rewinding operation can be started. According to the present invention, since a predictive drive amount is calculated on the basis of the film thickness to control a film feeding speed, the film can be accurately stopped. According to the present invention, since the apparatus is controlled by predicting a pulse count under fuzzy control, the apparatus has a simple structure and can be accurately, smoothly controlled. According to the present invention, since a 1-frame drive amount is predicted to control a driving speed, the stop positions of the film can be more accurately controlled. According to the present invention, since detecting perforations in the leading end portion of the film are detected to stop the rewinding operation, the rewinding operation can be reliably stopped with a simple arrangement. According to the present invention, control for stopping the rewinding operation can be accurately performed using a feed drive amount. According to the present invention, since a timer incorporated in a CPU or the like can be used, control for stopping the rewinding operation can be performed with a simple arrangement.

Therefore, as has been described above, according to the present invention, a predetermined drive amount before a perforation detecting means detects perforations is calculated on the basis of the number of motor drive pulses required in the preceding 1-frame feeding operation, the film feeding speed is reduced when a drive amount reaches the predetermined drive amount. For this reason, there is provided a film feeding apparatus for a camera in which each frame of a film having a small number of perforations can be stopped at a predetermined stop position without being influenced by a change in film feeding speed of each frame caused by an increase in diameter of the film wounded round the winding spool on the camera side, and the above stop operation can be easily performed regardless of the presence/absence of end detecting perforations in the end portion of the film and without additionally arranging members or constituent elements.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A film feeding apparatus for a camera, comprising:

film feeding means for feeding a film;

perforation detecting means for detecting a perforation formed in said film;

drive amount detecting means for detecting a drive amount provided by said film feeding means;

storing means for detecting the drive amount corresponding to one frame of said film on the basis of an output from said perforation detecting means and an output from said drive amount detecting means to store a 1-frame drive amount; and deceleration control means for reducing a feeding speed of said film feeding means on the basis of the 1-frame drive amount stored in said storing means and a drive amount detected by said drive amount detecting means in a next winding operation before a 1-frame winding operation is ended by said film feeding means.

2. An apparatus according to claim 1, wherein said film has at least one perforation corresponding to one frame.

3. An apparatus according to claim 1, wherein said deceleration control means includes means for multiplying a coefficient by the 1-frame drive amount stored in said storing means, and starting a decelerating operation when the drive amount detected by said drive amount detecting means reaches a multiplying result.

4. An apparatus according to claim 3, wherein said deceleration control means includes means for performing fuzzy control.

5. An apparatus according to claim 1, wherein said storing means includes means for updating data of the 1-frame drive amount each time a 1-frame winding operation is completed.

6. An apparatus according to claim 1, wherein said deceleration control means includes means for performing a decelerating operation using a predetermined drive amount in a first 1-frame winding operation.

7. An apparatus according to claim 1, further comprising stop control means for stopping a film feeding operation by said film feeding means in accordance with an output from said perforation detecting means upon completion of the 1-frame winding operation.

8. An apparatus according to claim 1, wherein said deceleration control means includes means for a decelerating operation by duty-driving a film feeding motor.

9. An apparatus according to claim 1, wherein said deceleration control means includes means for decreasing a drive voltage of said film feeding motor to reduce a speed of said film feeding motor.

10. An apparatus according to claim 1, wherein said deceleration control means includes means for predicting a 1-frame drive amount using the drive amount stored in said storing means and film thickness information, and controlling a reduction in the feeding speed on the basis of the predicted drive amount and the drive amount detected by said drive amount detecting means.

11. A film feeding apparatus for a camera, comprising:
film feeding means for feeding a film;
perforation detecting means for detecting a perforation formed in said film;
drive amount detecting means for detecting a drive amount provided by said film feeding means; and
feeding control means for calculating a predetermined drive amount, obtained before said perforation is detected, on the basis of a 1-frame drive amount, reducing a film feeding speed of said film feeding means when the drive amount reaches the predetermined drive amount, and stopping a film feeding operation of said film feeding means when said perforation detecting means detects said perforation.

12. A film feeding apparatus for a camera, comprising:
film feeding means for feeding a film;
perforation detecting means for detecting a perforation formed in said film;
pulse generating means for generating a pulse each time said film feeding means is driven;
pulse storing means for storing the number of pulses generated by said pulse generating means in a 1-frame feeding operation of said film;
operating means for calculating the number of pulses, generated before said perforation is detected, on the basis of data of said pulse storing means; and
feeding control means for reducing a film feeding speed of said film feeding means when the number of pulses generated in a next film feeding operation reaches the predetermined number of pulses calculated by said operating means, and stopping a film feeding operation of said film feeding means when said perforation detecting means detect said perforation.

13. An apparatus according to claim 12, wherein said operating means further includes means for calculating a predetermined limit in a 1-frame feeding operation on the basis of the number of pulses stored in said pulse storing means, and
said feeding control means includes means for performing a film rewinding operation when said perforation detecting means cannot detect said perforation even when the number of pulses reaches the predetermined limit.

14. An apparatus according to claim 12, wherein said operating means includes means using the number of pulses corresponding to a predetermined 1-frame feeding operation in place of the data of said pulse storing means in a film feeding operation from a first frame to a next frame after an initial film feeding operation is ended.

15. A film feeding apparatus comprising:
film feeding means for feeding a film;
perforation detecting means for detecting a perforation formed in said film;
drive amount detecting means for detecting a feed amount of said film provided by said film feeding means;
drive amount predicting means for predicting a drive amount of a next frame of said film on the basis of an output from said perforation detecting means and an output from said drive amount detecting means; and
speed control means for controlling a speed of a film feeding operation of said film feeding means on the basis of a predicted amount obtained by said drive amount predicting means.

16. An apparatus according to claim 15, wherein said drive amount predicting means includes means for calculating a predictive drive amount on the basis of drive amount information detected by said drive amount detecting means in a 1-frame feeding operation of said film, the number of photographed frames, and film thickness information.

17. An apparatus according to claim 15, wherein said speed control means includes means for performing a decelerating operation before a drive amount reaches the predicted drive amount.

18. An apparatus according to claim 17, wherein said speed control means includes means for performing fuzzy control.

19. An apparatus according to claim 15, further comprising stopping means for stopping a film feeding operation when a perforation corresponding to one frame is detected by said perforation detecting means.

20. An apparatus according to claim 15, wherein said speed control means includes means for predicting a 1-frame drive amount and starting a decelerating operation when the drive amount detected by said drive amount detecting means has a predetermined relationship with the predicted 1-frame drive amount.

21. A camera comprising:
a winding spool for winding a film;
a drive mechanism for rotating said winding spool in a winding direction of said film;
storing means for detecting and storing a rotation amount of said winding spool each time said winding spool winds said film by one frame; and
control means for controlling said drive mechanism to wind said film by one frame, said control means including means for adjusting a winding speed of said winding spool on the basis of a value stored in said storing means.

22. An apparatus for performing a 1-frame winding operation of a film by a drive force of a motor, comprising:
storing means for detecting and storing a rotation amount of said motor required in the 1-frame winding operation each time the 1-frame winding operation is performed; and
means for controlling a winding speed of a current 1-frame winding operation on the basis of a preceding rotation amount stored in said storing means.

* * * * *